United States Patent [19]

Koehler

[11] Patent Number: 5,062,689
[45] Date of Patent: Nov. 5, 1991

[54] ELECTROSTATICALLY ACTUATABLE LIGHT MODULATING DEVICE

[76] Inventor: Dale R. Koehler, 1332 Wagontrain Dr., Albuquerque, N. Mex. 87123

[21] Appl. No.: 570,539
[22] Filed: Aug. 21, 1990
[51] Int. Cl.⁵ ............................................. G02B 26/02
[52] U.S. Cl. ..................................... 359/230; 359/227
[58] Field of Search ............ 350/269, 384, 385, 96.13, 350/96.14, 266, 271, 272, 311, 319, 322

[56] References Cited

U.S. PATENT DOCUMENTS

| | | | |
|---|---|---|---|
| 3,746,911 | 7/1973 | Nathanson et al. | 358/231 |
| 4,441,791 | 4/1984 | Hornbeck | 350/385 |
| 4,736,202 | 4/1988 | Simpson et al. | 350/266 |
| 4,848,879 | 7/1989 | Nishimura et al. | 350/351 |

Primary Examiner—Bruce Y. Arnold
Assistant Examiner—James Phan

[57] ABSTRACT

The electrostatically actuatable light modulator utilizes an opaque substrate plate patterned with an array of aperture cells, the cells comprised of physically positionable dielectric shutters and electrostatic actuators. With incorporation of a light source and a viewing screen, a projection display system is effected. Inclusion of a color filter array aligned with the aperture cells accomplishes a color display. The system is realized in terms of a silicon based manufacturing technology allowing fabrication of a high resolution capability in a physically small device which with the utilization of included magnification optics allows both large and small projection displays.

16 Claims, 9 Drawing Sheets

ELECTROSTATICALLY ACTUATABLE LIGHT MODULATING DEVICE

BACKGROUND OF THE INVENTION

The present invention relates to electrostatically actuatable light modulators for spatially modulating incident light to produce images dependent upon the applied controlling electrical signals. The most common technology employed for television and other similar graphics display applications is the well known cathode ray tube. This well-developed scanning electron beam and light emitting phosphor technology has the disadvantages, however, of requiring rather high voltages and large evacuated glass enclosures and of being relatively expensive to manufacture.

A second display technology gaining importance, especially in smaller display applications, is the liquid crystal display. This display requires low driving voltages and operates in either a reflective or transmissive mode to modulate the incident light. A flat panel construction makes it attractive for small physical volume applications. It has a rather limited color capability, however, and is somewhat temperature sensitive. The ability to produce large arrays with individually addressable pixels, moreover, is a serious manufacturing challenge.

Some of these disadvantages have been addressed in more recent inventions of H. C. Nathanson disclosed in U.S. Pat. No. 3,746,911 entitled, "Electrostatically Deflectable Light Valves For Projection Displays", of L. J. Hornbeck disclosed in U.S. Pat. No. 4,441,791 entitled, "Deformable Mirror Light Modulator", and of G. E. Ott disclosed in U.S. Pat. No. 4,680,579 entitled, "Optical System For Projection Display Using Spatial Light Modulator System". These inventions utilize the semiconductor processing technology to effect the fabrication of high density pixel structures on silicon. The advantages of low cost batch processing techniques, therefore, accrue to these inventions but these advantages are offset by the requirement for concomitant complicated auxiliary elements; in the case of Nathanson, an electron beam tube and in the case of Ott, incorporating the modulator of Hornbeck, a Schlieren optical system.

SUMMARY OF THE INVENTION

It is a purpose of this invention to provide a high intensity, high persistence, transmissive type, high resolution light modulator. Advantages of low cost and small physical size result from photolithographic batch-processing manufacturability. It is also a purpose of the invention to provide an electrostatically controllable array of light transmitting apertures to effect image generation through spatial modulation of incident light from a companion light source. The electrostatically controllable aperture array is constructed of spring positionable shutters, electrostatic field actuators and a substrate plate patterned with an array of light transmissive apertures.

It is a further purpose of the present invention to transmit the generated light images onto a viewing screen and with an included color filter array to project color images onto the viewing screen the size of the images being controlled by included magnification optics.

DESCRIPTION OF THE ILLUSTRATED EMBODIMENTS

Figure 1:
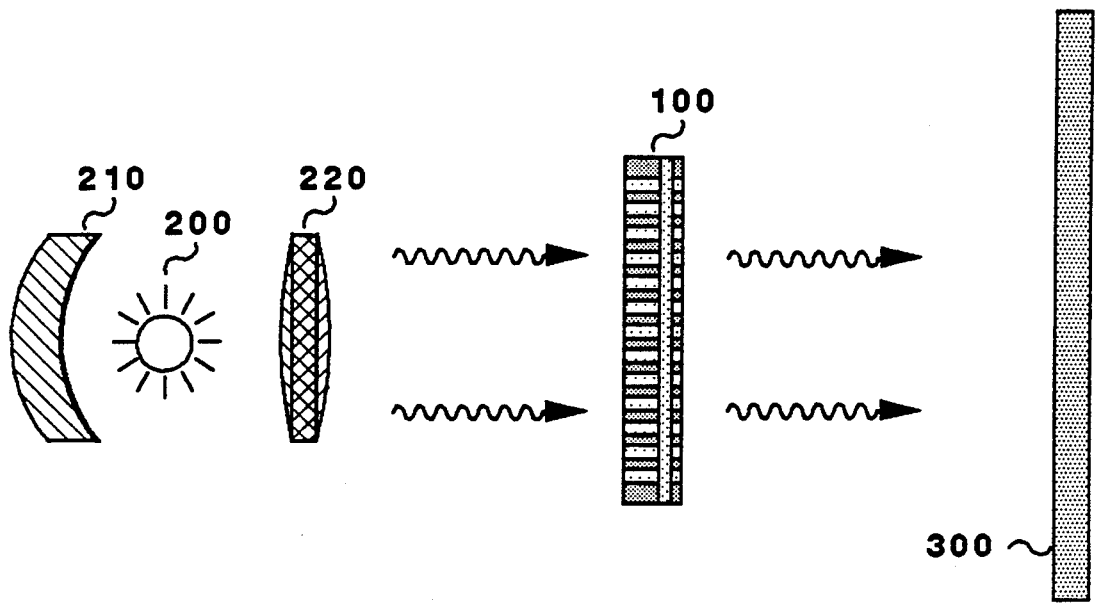
FIG. 1 is a schematic view showing a projection system according to the present invention.

FIG. 1 illustrates a projection system. The system comprises an electrostatically actuatable light modulator 100 illuminated by a light source 200. The light from the source is intensified by an optical system, consisting of a reflecting mirror 210 and concentrating lens 220, onto the input face of the light modulator. The transmitted and spatially modulated light beam from the modulator is passed onto viewing screen 300. As the incident light beam strikes modulator 100, shown in detail in diagrammatic FIG. 2 and in the sectional and plane views, FIGS. 4 and 3, only that light fraction striking the apertures 111 will pass on through the opaque substrate 110 to the shutters 120. The substrate 110 and the aperture definition layer 113 are omitted in the plane view of FIG. 3 to allow better visibility of the constructional details of the spring element 140 and the shutter element 120. The position of the opaque shutters 120 over the apertures 111 and therefore the amount of light able to pass on through the modulator 100 is indirectly controlled by the electric field formed by the plates 130 and 131 and by the restoring spring 140. The window area of each aperture 111 in the modulator array 100 is individually controlled by its own aperture diode switch pair 150 and 151 which connect the field plates 130 and 131 to the electrical voltage source 170. Alternatively, the switch pair 150 and 151 can be constructed as transistors. Separate addressing circuitry of standard design 180 activates switches 150 and 151 and allows the drive circuit 190 to charge the cell capacitance formed by field electrodes 130 and 131. Electrical interruption or isolation of the cell upon termination of the charging process produces the condition of a charged capacitor connected to the back biassed diode 150, which is an extremely low leakage current switch, in other words, an extremely high resistance discharge path, therefore disallowing the physical position of the shutter 120 from changing, thus producing an extremely long persistence image. Writing speed or image production speed on the other hand is determined by the mechanical response time of the shutter-spring combination which is directly dependent on the shutter 120 mass and inversely dependent on the spring constant of the spring element 140. Typical response times are 10 microseconds or less.

Figure 2:
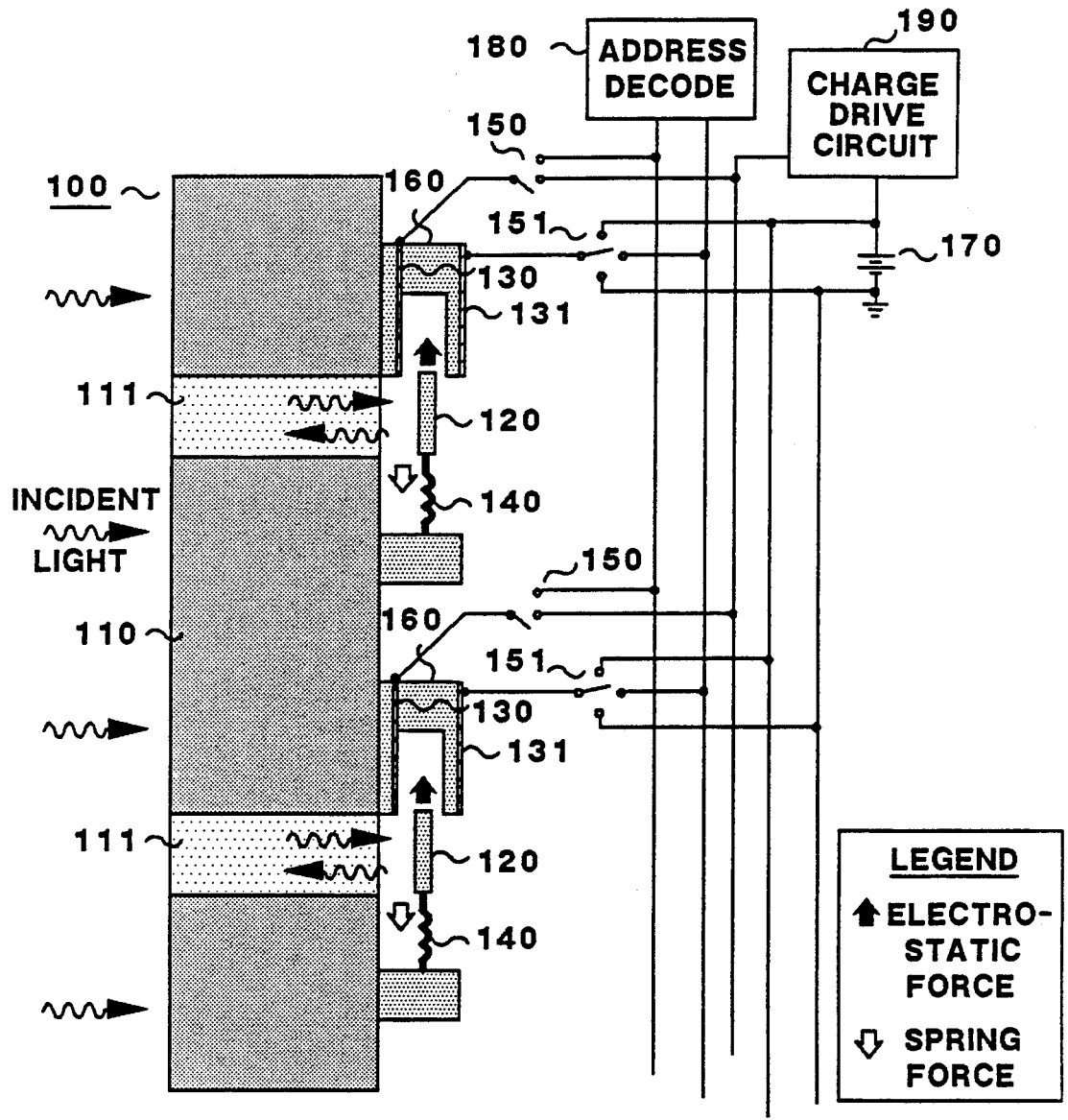
FIG. 2 is an enlarged schematic view of the light modulating device of the present invention.
Figure 4:
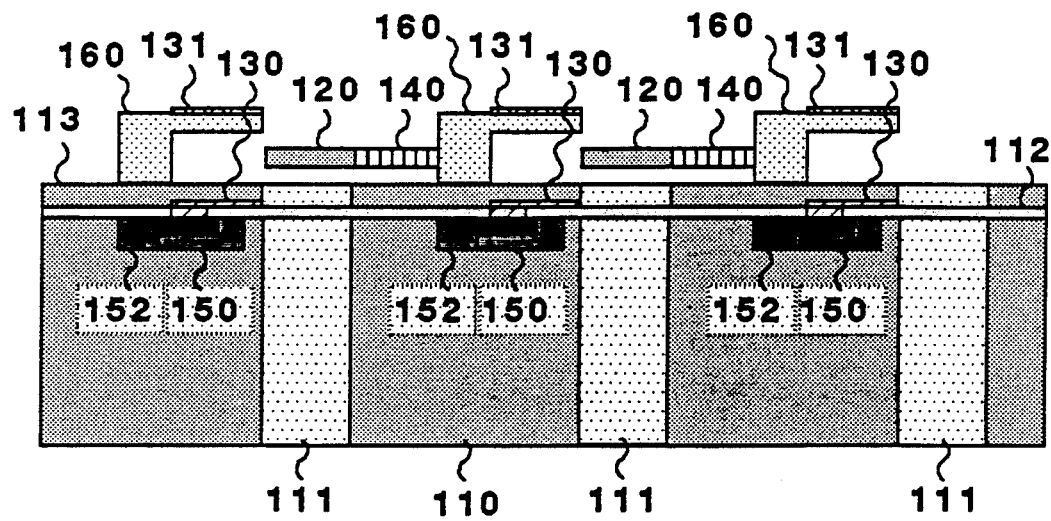
FIG. 4 is a sectional view along line A—A of FIG. 3 of the light modulator.
Figure 3:
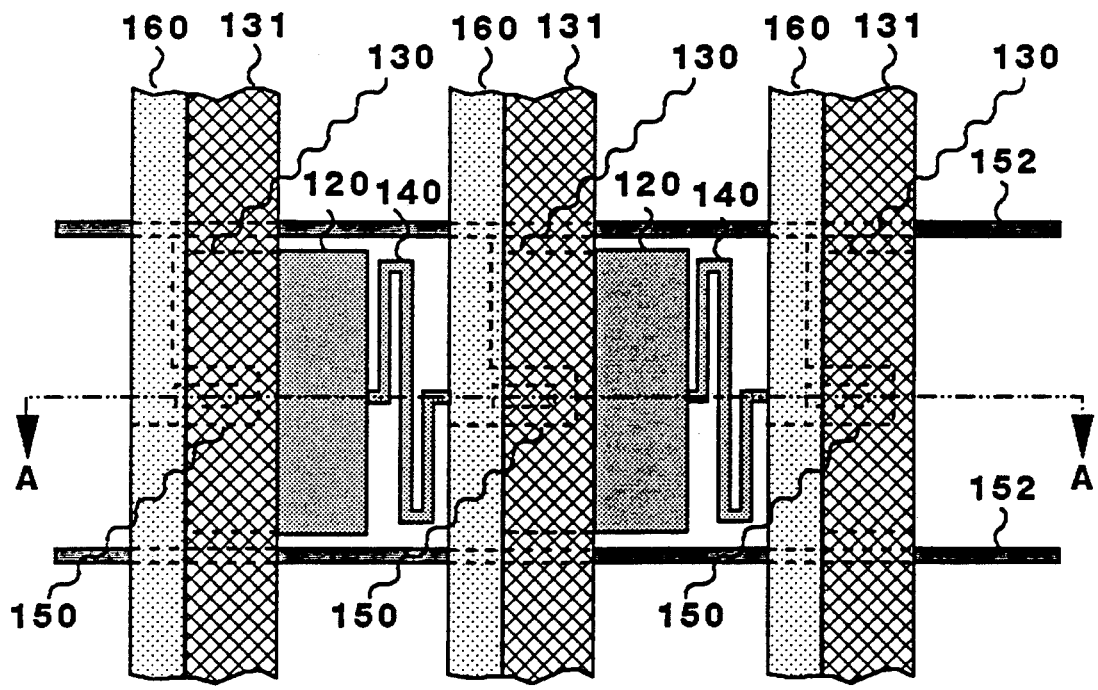
FIG. 3 is an enlarged plane view of the light modulator cell structure.

The physical arrangement depicted in FIGS. 2, 3, and 4 is used with a charge-based drive circuit 190. The electrostatic force tending to pull the dielectric shutter 120 into the field gap between plates 130 and 131, therefore exposing the aperture 111, is to first approximation a constant force and directly proportional to the charge placed on the field plates 130 and 131 by the current drive pulse from the drive circuit 190. Drive pulse timewidths are dictated by the number of pixels in the array and the number of images to be created per second for flicker free performance as viewed by the human observer. This electrostatic force is balanced by the position dependent restoring force of spring element 140 thereby causing a unique equilibrium position of the shutter 120 and therefore generating a window area for light transmission which is directly dependent on the electric charge and inversely proportional to the spring constant. The individual aperture's window area and therefore the intensity of light allowed through the aperture 111 is consequently electrically determined. Each of the apertures 111 in the modulator array is activated in a similar fashion to that just described and according to the electrical signals associated with the image pattern to be displayed. In the unactivated field condition, the relaxed position of the shutter 120 completely covers the aperture 111 and no light is transmitted while in the fully excited field condition the shutter 120 is positioned totally within the lateral boundaries of the field plates 130 and 131, consequently fully exposing the aperture 111 whereby maximum light transmission through the modulator takes place. All light intensities from zero to this maximum are possible on a continuous scale determined by the position of the shutter 120 over the aperture 111 and controllable by the electrical charge-drive circuitry 190. The maximum achievable light intensity is therefore the ratio of the total aperture area to the total modulator area. This area ratio is on the order of 10-20% for the design geometries utilized to date. The present invention is therefore able to efficiently utilize the high light intensities of projection system lamps.

Image generation in this invention is understood to be of a discrete pixel type where each of the individual apertures 111 constitutes a pixel or picture element. In this sense, the image production is similar to that produced by the shadow mask technology of television tubes.

Insofar as the geometry of the apertures 111 allows a bundle of diverging rays to pass through each aperture then the transmitted light output of the modulator 100 can be considered an object source of light and can be viewed directly by the eye within the divergent light angle cone emanating from the apertures 111. A further scattering and diverging of the light rays (see FIGS. 1 and 5), takes place at the viewing screen 300 allowing for a still larger viewing angle. While the image size at the modulator 100 is the physical dimensional extent of the modulator array 100, a second optical system consisting of a magnification control lens 600 placed between the modulator 100 and the viewing screen 300 allows the image size to be further controlled, that is increased or decreased.

In the embodiments illustrated in FIGS. 2–4 and 6–17, small scale microstructures achievable with semiconductor integrated circuit processing technology and silicon micro-machining technology are shown. The ability to fabricate the light modulator device of this invention in semiconductor integrated circuit technology makes possible the achievement of microscale aperture cells and therefore, a large number of elements for a high resolution display.

Figure 5:
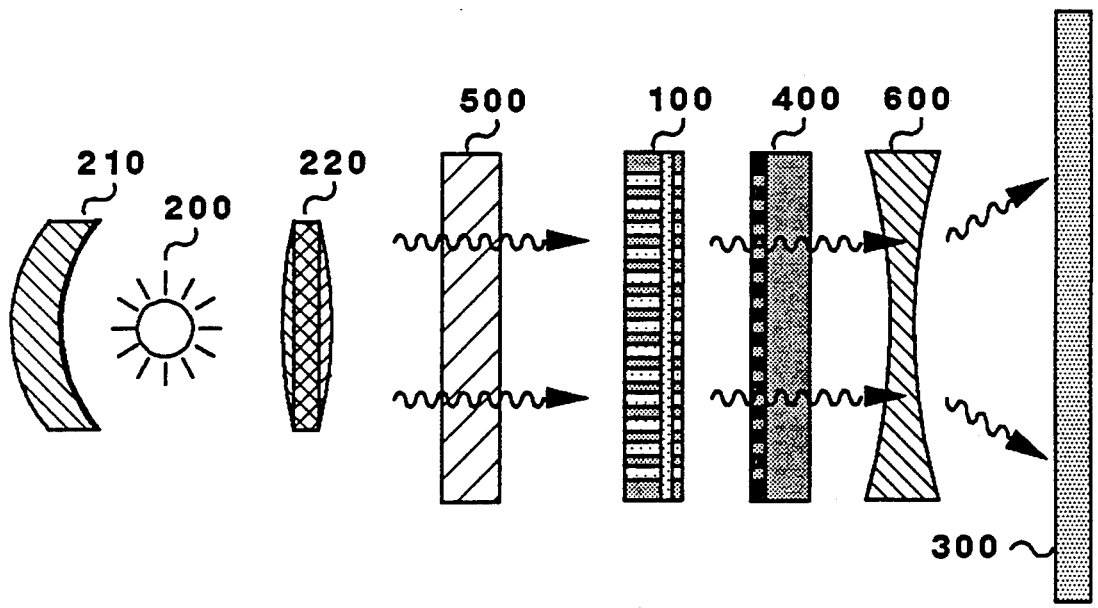
FIG. 5 is a schematic view showing another embodiment of the projection system according to the present invention.

To allow maximum visible light intensity to be incident on modulator array 100 from light source 200, while minimizing the heat or infrared radiation from the source 200 from striking the modulator 100, an infrared filter or wavelength dependent mirror element 500, shown in FIG. 5, is interposed between the light source 200 and the modulator array 100.

A color display system is realized as in FIG. 5 when a tri-stimulus color filter array 400 is positionally aligned over the aperture array 111 of the modulator 100, each color filter element coinciding spatially with an individual cell element or aperture 111 of the modulator 100.

As mentioned above, modulator 100 manufacturing technology can follow standard silicon integrated circuit fabrication methodology in conjunction with silicon micromachining techniques to form free moving three dimensional mechanical elements such as the springs 140 and shutter elements 120 incorporated in this invention. Such manufacturing steps are illustrated in FIGS. 6–12.

Figure 6:
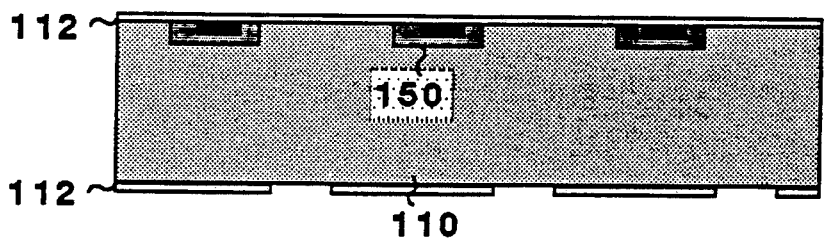
FIGS. 6, 7, 8, 9, 10, 11 and 12 illustrate steps in the manufacture of the light modulator.

Electronic circuit switch components 150 are first fabricated with appropriate interconnection lines in the silicon substrate 110 as shown in FIG. 6; cover layer 112 on both top and bottom surfaces is then deposited. This layer 112 serves the three functions of (1) providing an optically transparent layer, which (2) is electrically insulating and which (3) serves as a chemical-etch resistant layer to control the fashioning of the silicon. This layer 112 is patterned on the bottom surface to allow aperture formation as the last fabrication step. The cover layer 112 is typically silicon dioxide or silicon nitride.

Figure 7:
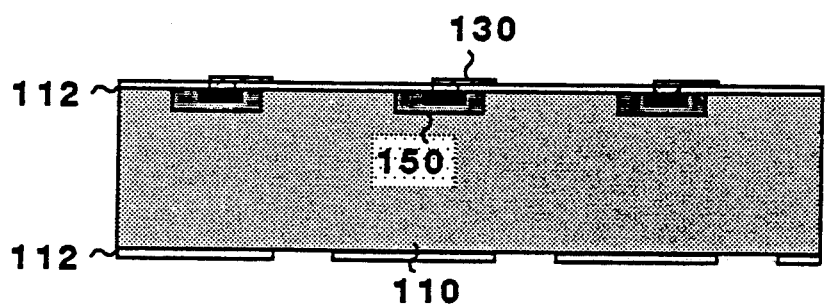

A metallization layer is then deposited on the top surface and patterned to form the field electrodes 130 on top of layer 112 after appropriate connection vias have been provided to form electrical connections to switch elements 150. These steps are shown in FIG. 7.

Figure 8:
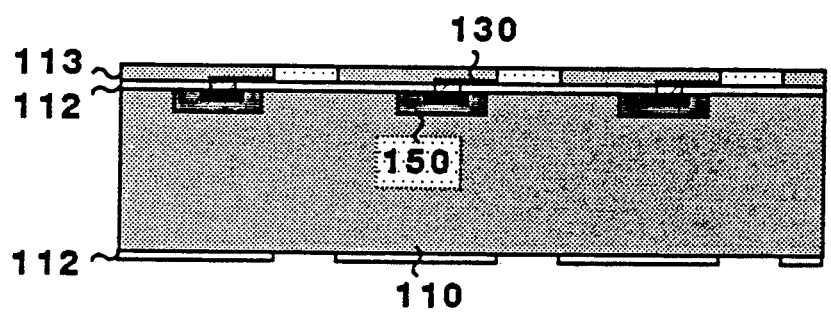

Aperture definition at the top surface of the modulator 100 is accomplished as illustrated in FIG. 8 by depositing an opaque layer 113 such as polysilicon and then removing the material in a rectangular pattern aligned with the bottom-surface aperture channel definition.

Figure 9:
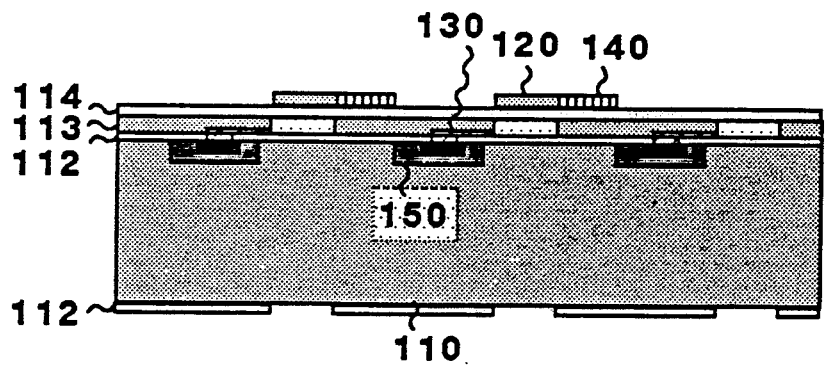

A sacrificial layer 114, typically a glass compound, is then laid down over the entire wafer surface. A subsequent dielectric opaque layer is then deposited and patterned to form the shutters 120 and restoring spring elements 140 as an integral unit, as illustrated in FIG. 9.

Figure 10:
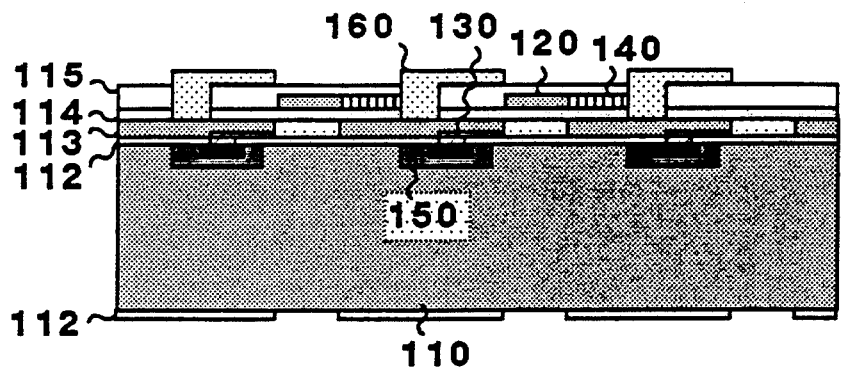

A second sacrificial glass layer 115 is then put down, as in FIG. 10, followed by patterning and then deposition and patterning of the field electrode support pedestals 160. The support pedestals are of an insulating material which can be commonly silicon dioxide or polysilicon. The support pedestals 160 are fabricated to physically join with the base end of the spring element 140, thereby providing the fixed foundation terminus of the spring element 140. The moving end of the spring element 140 is fashioned integrally with the shutter element 120 during the deposition stage of FIG. 9.

Figure 11:
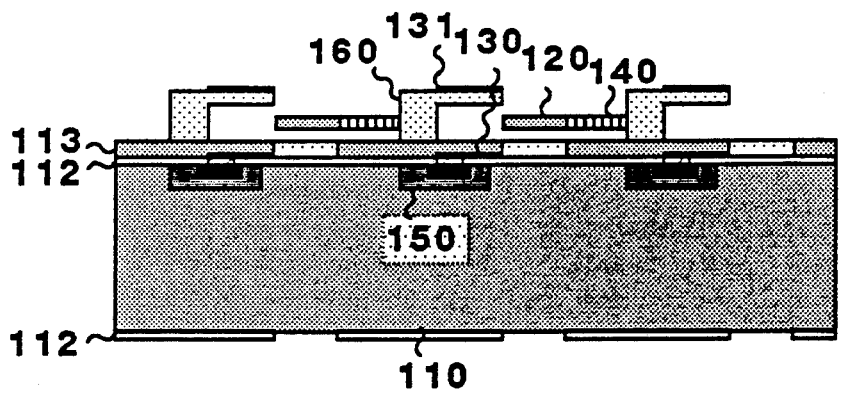

FIG. 11 illustrates the structure after a glass dissolution processing step which removes the sacrificial glass layers 114 and 115 leaving the free standing shutter 120 and spring 140 elements. The dissolution step is preceded by the electrode 131 deposition process.

Figure 12:
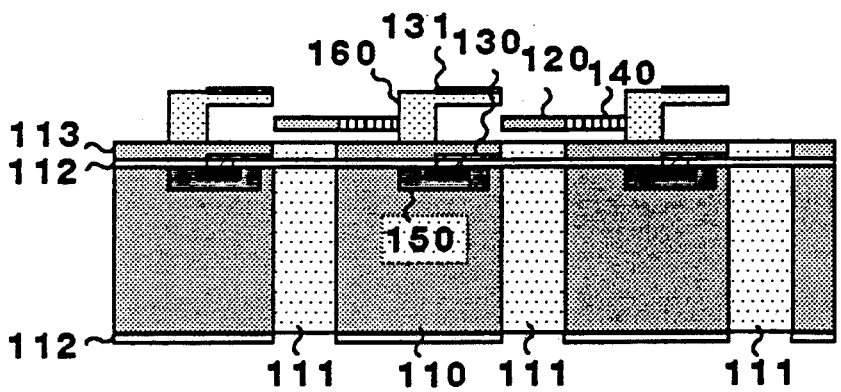

The final micromachining step, shown in FIG. 12, consists of chemically etching channels, the apertures 111, into the modulator substrate 110. The use of a proper crystalline orientation, in this case (110) silicon, is necessary to produce the vertical walled aperture channels 111 of this structure. This step is possible by using appropriate anisotropic silicon etchants such as potassium hydroxide, KOH, which etch fastest along the (110) directions and extremely slowly in the (111) directions which form the walls of the aperture channels. Silicon crystalline orientations, indicated here in parentheses, are not to be confused with the reference numbering system.

Figure 14:
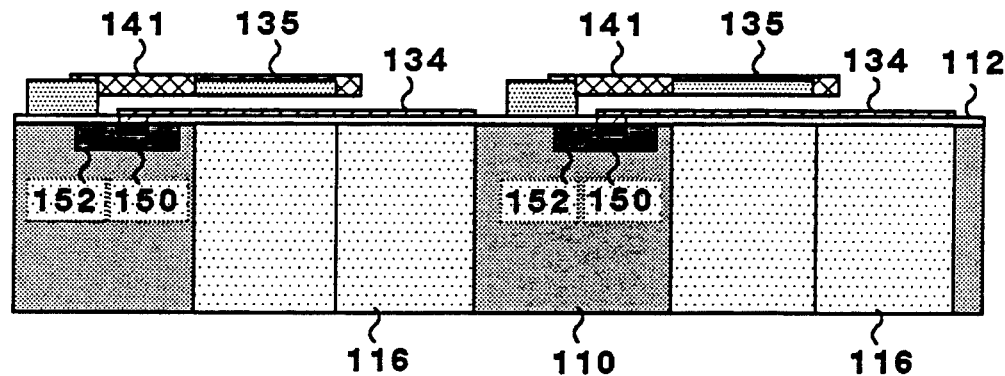
FIG. 14 is a sectional view along line B—B of FIG. 13 of the light modulator.
Figure 13:
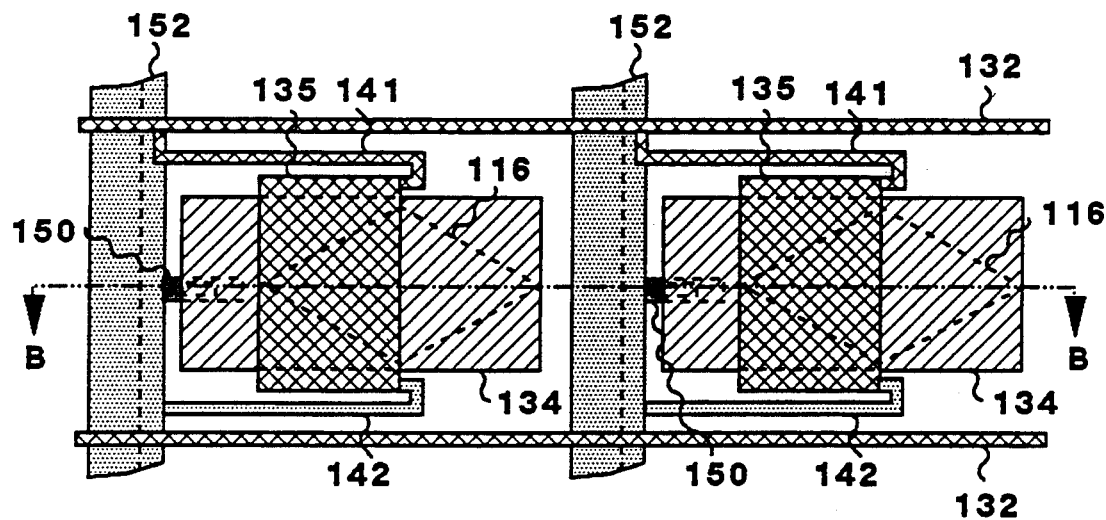
FIG. 13 is an enlarged plane view of a Fabry-Perot mechanically positionable shutter.

An alternative shuttering concept is depicted in FIGS. 13 and 14 wherein a triangular shaped aperture 116 is incorporated. In the plane view of FIG. 13, the substrate 110 has been omitted to illustrate with more contrast the constructional details of the spring elements 141 and 142 and the shutter element 135. The aperture 116 is totally covered with an electrode film 134 of a material also suitable as a mirror, such as gold or aluminum. The shutter element 135 is attached to folded spring elements 141 and 142 and plated with a conductive layer, also acting as a mirror and forming the top field electrode of the actuator 100. The top electrodes are interconnected by the conductor array 132. Upon electrical charging of the electrode pair consisting of the plated shutter 135 and the film 134, an electrostatic force normal to the plane of the electrodes is produced and pulls the top shutter electrode 135 toward the bottom electrode 134. This electrostatic force is counterbalanced by the supporting position dependent force of the spring pair 141 and 142. The cantilever construction of the shutter 135 and spring elements 141 and 142 causes the tip end of the shutter 135 to deflect more than the base end attached to the spring pair 141 and 142, and a geometrical wedge relationship is generated between the two mirror surfaces 134 and 135, as a result. The wedged cavity bounded by the mirrors 134 and 135 constitutes a Fabry Perot interferometer and transmits any incident light from the aperture 116 only at a point along the wedge axis where a constructive interference condition exists. For submicron mirror separations and for monochromatic incident light, there will be a unique position for a given deflection or given electrostatic force where the constructive interference condition exists. In conjunction with the triangular shaped aperture 116, the intensity of the emergent light will be controlled therefore by the charge placed on the electrode pair 134 and 135. Outside of the lateral boundary formed by the overlap of the shutter electrode mirror 135 and the electrode mirror film 134, only the mirror 134 is seen by light moving through the aperture 116, and this light is therefore reflected back down the aperture and not transmitted. The rhombohedral shape of the aperture 116 is a result of the orientation of the (111) planes in the (110) oriented silicon substrate. A composite color cell will be constituted by light beams of three monochromatic tristimulus filter wavelengths generated by an auxiliary color filter array, each incident upon an individual modulator cell wherein relative control of the three cells' transmission achieves the desired chrominance while control of overall cell intensity achieves the desired luminance.

Figure 15:
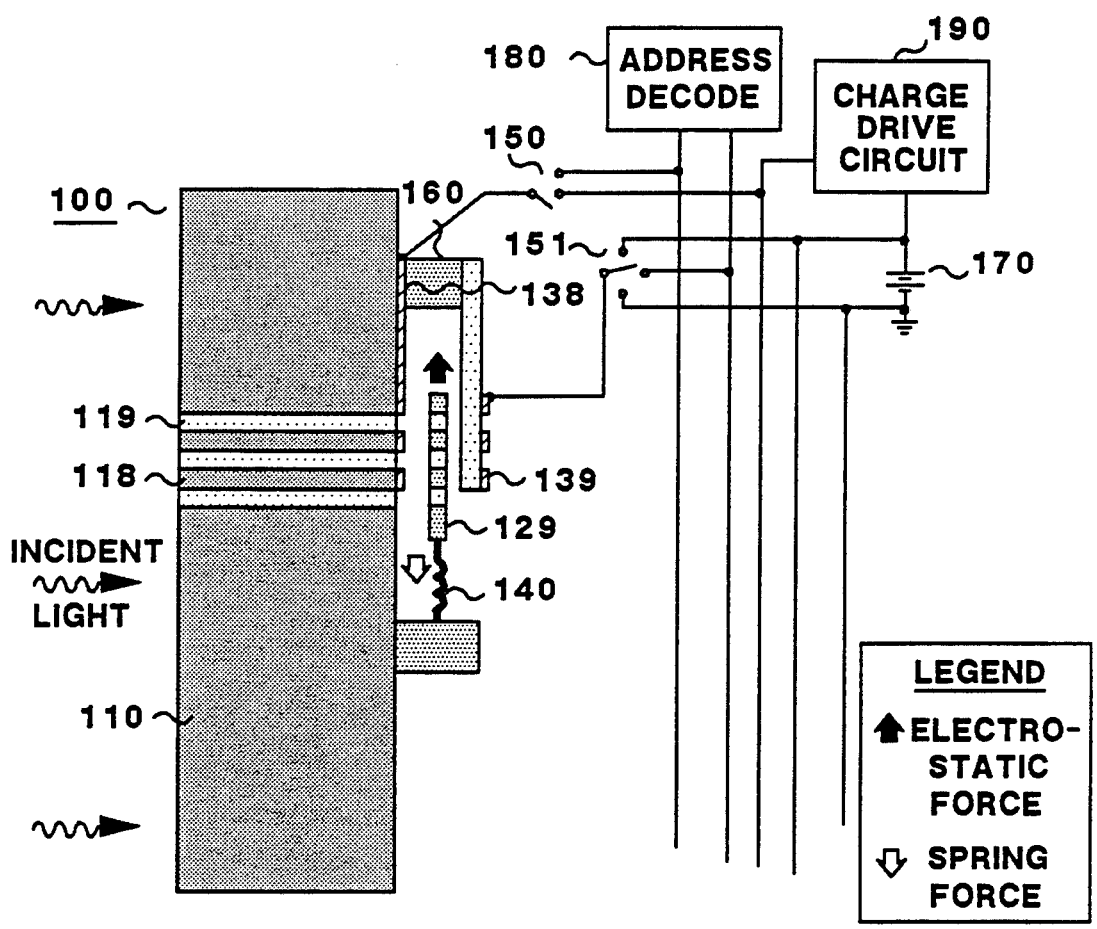
FIG. 15 is an enlarged schematic view of an alternative embodiment of the light modulating device incorporating a slotted aperture and slotted shutter.

To effect a reduction in the required mechanical excursion of the shutter element, the aperture-shutter concept in FIG. 15 is disclosed. Such mechanical motion reduction afforded by this slotted design is desirable to effect a strain reduction in the spring element 140. Another consequence of the motion reduction is a reduction in the electrostatic force required, given no change in the spring constant of spring element 140, and therefore a reduction in electrostatic voltage. The original single aperture element 111 of FIG. 2 has been subdivided into aperture subelements 119. Similarly, field electrode elements 130 and 131 have been subdivided into electrode subelements 138 and 139 and shutter element 120 has been subdivided into subelements 129. For a minimization of the required mechanical excursion, the individual partitional subelements, in all cases 119, 138, 139 and 239, are physically separated or spaced apart by a separation distance equal to the subelement dimensional extent along the partitioning axis, thereby forming a slotted pattern where the slot extent is equal to the slot spacing. For the aperture-substrate slot pattern, for example, aperture extent 119 equals substrate extent 118. To move from the completely closed window condition, where shutter elements 129 completely cover aperture elements 119, to the completely open window condition, where shutter elements 129 are positioned over substrate elements 118, requires a motional excursion distance of only one slot extent. The slotted structure 129 is illustrated in the electrically actuated condition, positioned in the electrical field gaps formed by electrodes 138 and 139. In this condition, the slotted openings in the shutter element 129 are positionally aligned over the slotted aperture openings 119 in the substrate 110 thereby allowing maximum light transmission through the modulator 100.

Figure 16:
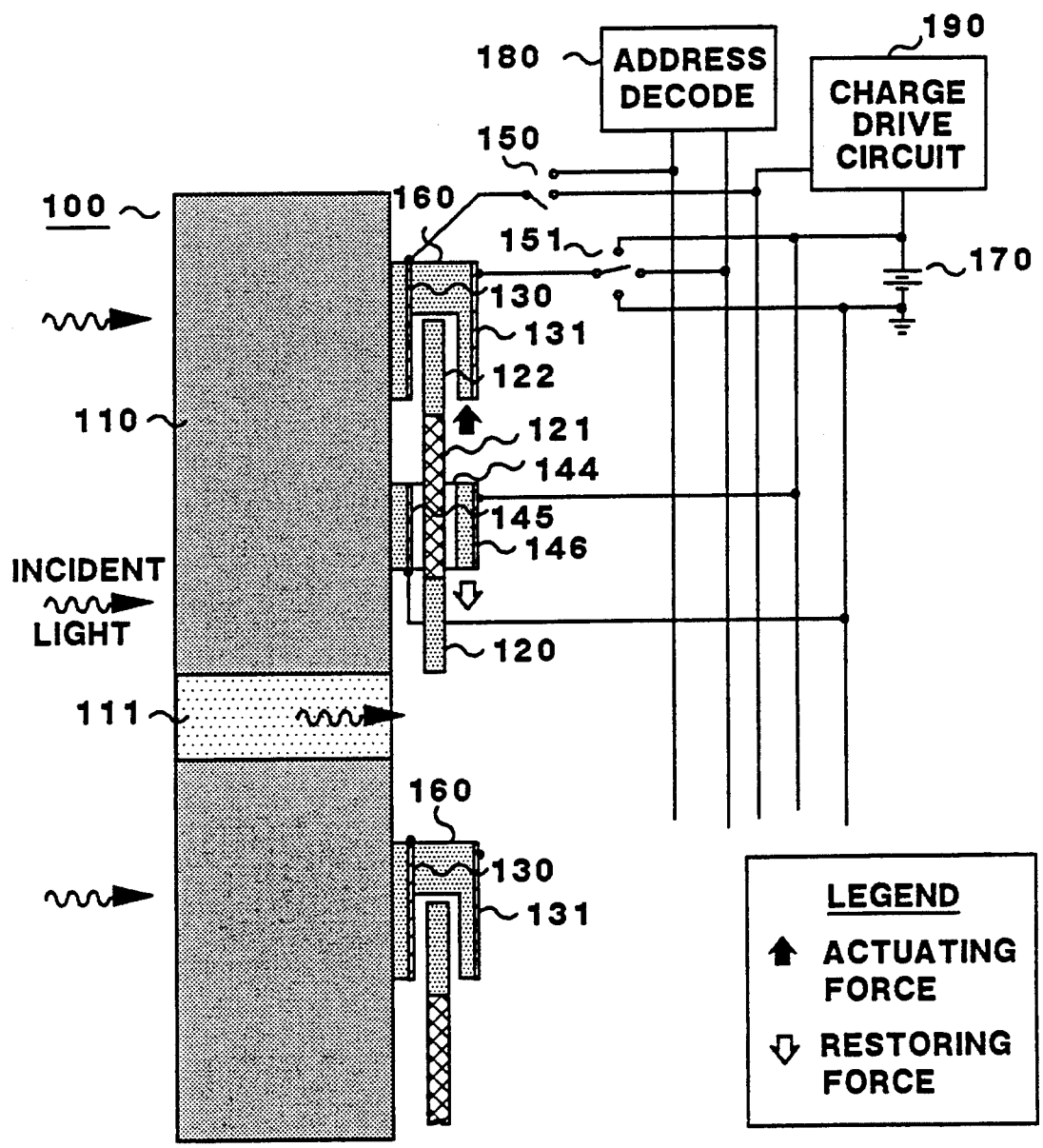
FIG. 16 is an enlarged schematic view of an alternative embodiment of the light modulating device incorporating an electrostatically-driven position-dependent restoring force element.

Although a position dependent restoring force element has been discussed thus far in terms of a mechanical spring element 140, the restoring force function can also be accomplished in an electrostatic force realization. FIG. 16 illustrates in diagrammatic fashion the modifications required to the mechanical spring element 140 to generate the electrostatic element 144. The electrostatic element 144 consists of electrodes 145 and 146 connected to the voltage supply element 170. The electrostatic field in the gap between the electrodes 145 and 146 acts on the extended dielectric shutter element 120 pulling the shutter control region 121 into the gap. This restoring force acts in a direction to oppose the electrostatic actuating force of field plates 130 and 131 acting on the dielectric shutter region 122. The shutter control region 121 is geometrically fashioned in combination with the fashioning of the field electrodes 145 and 146 so as to create a position dependent electrostatic force which is linearly dependent on the shutter's position relative to the aperture 111. An electrostatic equivalent 144 to a mechanical elastic spring 140 is thereby accomplished. The extended shutter element 120 is shown with no physical attachment to the surrounding structure although a supporting attachment can be fabricated if the supporting attachment element does not inhibit the electrostatic restoring force element.

Figure 17:
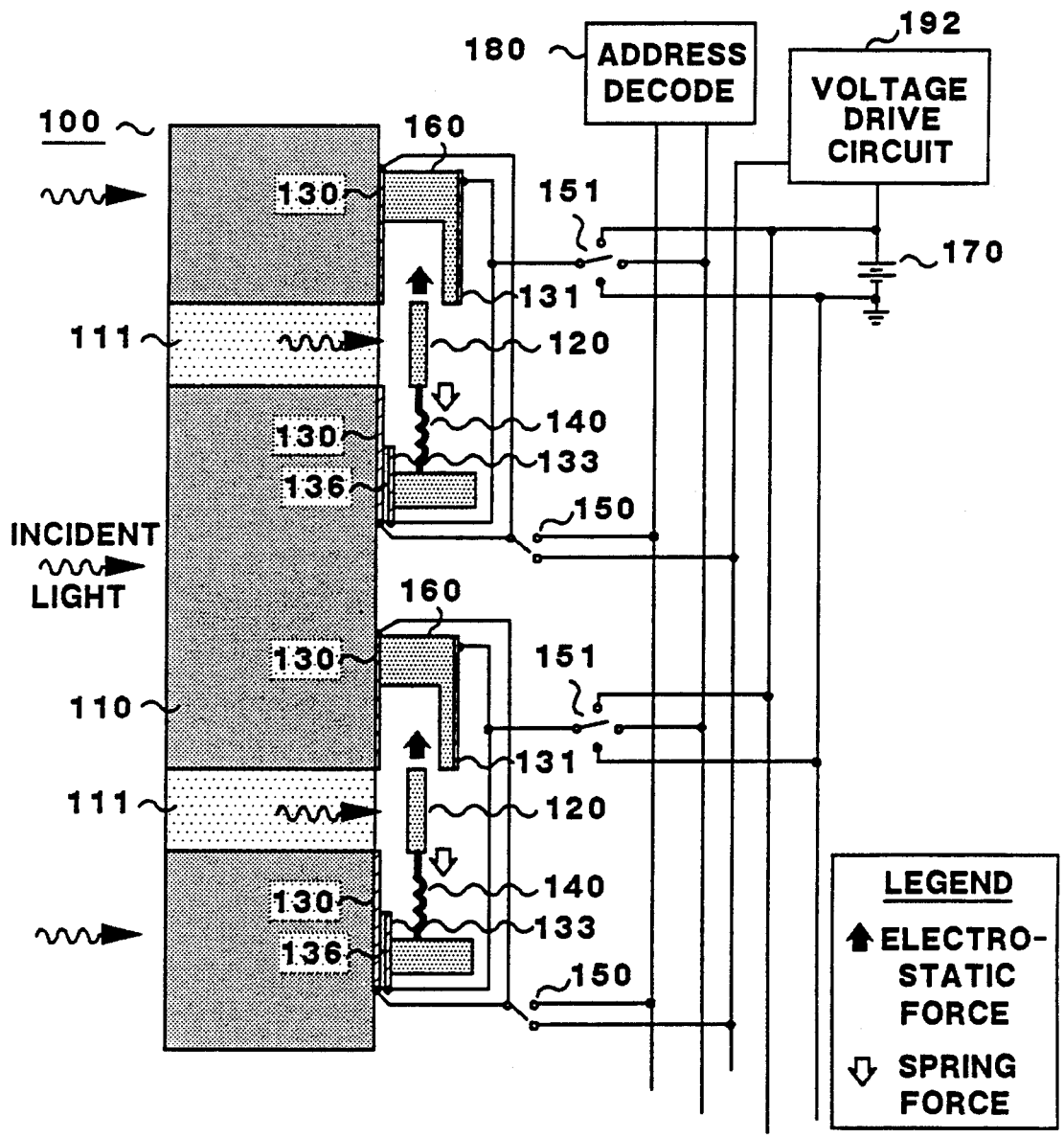
FIG. 17 is an enlarged schematic view of an alternative embodiment of the light modulating device of the present invention incorporating a voltage drive system.

An alternative drive concept in cooperation with an alternative modulator cell construction is illustrated in FIG. 17. The two primary differentiating features of this alternative embodiment are the drive circuit 192 and a cell storage capacitor formed by electrodes 130 and 133 with dielectric element 136, therebetween. This large capacitor, approximately ten times the capacitance of the shutter actuator capacitor formed by field electrodes 130 and 131, is electrically in parallel with the shutter actuator capacitor and is charged during actuation to the cell signal voltage. Because of this capacitance ratio, the cell storage capacitor acts as a voltage source for the actuator upon termination of the drive signal. With a voltage drive source, the shutter element 120 experiences an electrostatic force tending to move it into the field gap of field electrodes 130 and 131 and away from the aperture 111, thereby increasing the window area. The magnitude of this repulsive electrostatic force is K, the dielectric constant of the shutter material, times greater than the charge-drive embodiment force. The position dependent spring force of spring element 140 again opposes the electrostatic force and an equilibrium shutter position is attained where the two forces are balanced. Because of the larger electrostatic force, lower modulator actuation voltages are advantageously achieved in this embodiment. Operation at less than 10 volts is possible which is compatible with standard semiconductor operational voltages.

I claim:

1. An electrostatically actuatable light modulating device comprising:
    a substrate plate patterned with an array of light passing apertures; and,
    a co-located array of shuttering cells to spatially control light transmission through the aperture array, each of the cells comprising:
    a mechanically positionable shutter means;
    an electrostatic field actuator means to forcibly move the shutter means;
    a position dependent mechanical restoring force means acting on said shutter means and in opposition to said electrostatic field actuator means; and,
    an electrical switch element means which is uniquely addressable within the array, to provide electrical energy to said electrostatic field actuator means.

2. The device according to claim 1 wherein the shutter means is a mechanically positionable opaque dielectric.

3. The device according to claim 1 wherein the shutter means is a slotted shutter physically aligned to a slotted aperture array.

4. The device according to claim 1 wherein the shutter means is a wedged Fabry-Perot interferometer.

5. The device according to claim 1 wherein the electrical switch element means is a diode.

6. The device according to claim 1 wherein the electrical switch element means is a transistor.

7. The device according to claim 1 wherein the electrostatic field actuator means is a charge-based drive circuit.

8. The device according to claim 1 wherein the electrostatic field actuator means is a voltage-based drive circuit and a storage capacitor.

9. The device according to claim 1 wherein the position-dependent restoring force means is a mechanical spring element.

10. The device according to claim 1 wherein the position-dependent restoring force means is an electrostatic force element.

11. The device specified in claim 1, in combination with a light source, an optical system for concentrating light onto the modulating device and a viewing screen for displaying spatial images transmitted by the modulating device.

12. The combination specified in claim 11, in combination with a tristimulus color filter positionally aligned to the light modulator to produce color images.

13. The combination specified in claim 12, in combination with a second optical system for projecting magnified color images.

14. The combination specified in claim 13, in combination with an infrared filter or mirror interposed between light source and modulator to reduce heating of the modulator array.

15. The combination specified in claim 11, in combination with a second optical system for projecting magnified images.

16. The combination specified in claim 15, in combination with an infrared filter or mirror interposed between light source and modulator to reduce heating of the modulator array.

* * * * *